United States Patent
Park et al.

(10) Patent No.: US 11,670,800 B2
(45) Date of Patent: Jun. 6, 2023

(54) POLYMER ELECTROLYTE FOR SECONDARY BATTERY AND SECONDARY BATTERY INCLUDING THE SAME

(71) Applicant: LG Chem, Ltd., Seoul (KR)

(72) Inventors: Sol Ji Park, Daejeon (KR); Kyoung Ho Ahn, Daejeon (KR); Chul Haeng Lee, Daejeon (KR); Jun Hyeok Han, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 129 days.

(21) Appl. No.: 16/633,237

(22) PCT Filed: Nov. 26, 2018

(86) PCT No.: PCT/KR2018/014638
§ 371 (c)(1),
(2) Date: Jan. 23, 2020

(87) PCT Pub. No.: WO2019/107855
PCT Pub. Date: Jun. 6, 2019

(65) Prior Publication Data
US 2020/0168950 A1    May 28, 2020

(30) Foreign Application Priority Data

Nov. 28, 2017 (KR) .................. 10-2017-0160818
Nov. 23, 2018 (KR) .................. 10-2018-0145929

(51) Int. Cl.
| | | |
|---|---|---|
| H01M 10/056 | (2010.01) | |
| H01M 10/0565 | (2010.01) | |
| H01M 4/134 | (2010.01) | |
| H01M 4/38 | (2006.01) | |
| H01M 10/0525 | (2010.01) | |

(52) U.S. Cl.
CPC ....... *H01M 10/0565* (2013.01); *H01M 4/134* (2013.01); *H01M 4/382* (2013.01); *H01M 10/0525* (2013.01); *H01M 2300/0082* (2013.01); *H01M 2300/0085* (2013.01)

(58) Field of Classification Search
CPC ......... H01M 10/0565; H01M 10/0525; H01M 4/382; H01M 4/134; H01M 2300/0085; H01M 2300/0082
See application file for complete search history.

(56) References Cited

U.S. PATENT DOCUMENTS

| | | | |
|---|---|---|---|
| 6,033,804 A | 3/2000 | Doyle et al. | |
| 2005/0287441 A1* | 12/2005 | Passedni | H01B 1/122 |
| | | | 429/307 |
| 2006/0177732 A1 | 8/2006 | Visco et al. | |
| 2010/0273063 A1* | 10/2010 | Wallace | H01M 10/0568 |
| | | | 429/317 |
| 2011/0159377 A1 | 6/2011 | Lee et al. | |
| 2012/0231336 A1 | 9/2012 | Kim et al. | |
| 2013/0252113 A1 | 9/2013 | Yu et al. | |
| 2015/0147645 A1 | 5/2015 | Lee et al. | |
| 2015/0255782 A1* | 9/2015 | Kim | H01M 4/0426 |
| | | | 429/405 |
| 2016/0028127 A1 | 1/2016 | Ahn et al. | |
| 2016/0336613 A1 | 11/2016 | Mochizuki et al. | |
| 2016/0372787 A1 | 12/2016 | Chung et al. | |
| 2017/0309917 A1* | 10/2017 | Lee | H01M 4/13 |
| 2019/0115616 A1 | 4/2019 | Ahn et al. | |

FOREIGN PATENT DOCUMENTS

| | | | | |
|---|---|---|---|---|
| CN | 102683749 A | 9/2012 | | |
| CN | 103579676 A | 2/2014 | | |
| CN | 103647110 A | 3/2014 | | |
| CN | 104798244 A | 7/2015 | | |
| CN | 104900831 A | 9/2015 | | |
| CN | 105811004 A | 7/2016 | | |
| CN | 106159328 A | 11/2016 | | |
| EP | 2498326 A1 * | 9/2012 | ............ | H01M 4/131 |
| JP | H10284128 A | 10/1998 | | |
| JP | 2009-140641 A | 6/2009 | | |
| KR | 10-2000-0052944 A | 8/2000 | | |
| KR | 10-1175464 B1 | 8/2012 | | |
| KR | 10-2012-0101970 A | 9/2012 | | |
| KR | 10-2015-0050507 A | 5/2015 | | |
| KR | 10-2016-0114706 A | 10/2016 | | |
| KR | 10-2017-0040175 A | 4/2017 | | |
| KR | 10-2017-0126397 A | 11/2017 | | |
| KR | 10-1805649 B1 | 12/2017 | | |
| WO | 2000/024709 A2 | 5/2000 | | |
| WO | 2017/196012 A1 | 11/2017 | | |

OTHER PUBLICATIONS

Sigma Nafion website (https://www.sigmaaldrich.com/US/en/product/aldrich/676470 as published on Jul. 5, 2022) (Year: 2022).*
Mauritz (Kenneth A. Mauritz and Robert B. Moore; "State of Understanding of Nafion"; Chem. Rev. 2004, 104, 4535-4585) (Year: 2004).*
Extended European Search Report issued from the European Patent Office dated May 7, 2020 in corresponding European patent application No. 18884399.9.
Wang et al., "Evaluation of the microstructure of dry and hydrated perfluorosulfonic acid ionomers: microscopy and simulations," Journal of Materials Chemistry A, vol. 1, No. 3, pp. 938-944 (2013).
Geiculescu, O.E. et al., "Solid polymer electrolytes from lithium (perfluorovinylether) sulfonate-Derived salts dissolved in high-molecular-weight poly(ethylene oxide)", Jounral of Flourine Chemistry, vol. 183 (2016) pp. 14-22.

(Continued)

*Primary Examiner* — Jeremiah R Smith

(74) *Attorney, Agent, or Firm* — Morgan, Lewis & Bockius LLP

(57) ABSTRACT

The present invention provides a polymer electrolyte for a secondary battery, which may secure high ionic conductivity and mechanical strength, and a lithium secondary battery including the same.

10 Claims, 1 Drawing Sheet

(56) References Cited

OTHER PUBLICATIONS

Tu, Z. et al., "Designing Artificial Solid-Electrolyte Interphases for Single-Ion and High-Efficiency Transport in Batteries", Joule, Oct. 11, 2017, Elsevier Inc., vol. 1, pp. 394-406.
Shaplov, A.S. et al., "Recent Advances in Innovative Polymer Electrolytes based on Poly (ionic liquid)s", Electrochimica Acta, (2015) vol. 175, pp. 18-34.
Shi et al., "A Lithiated Perfluorinated Sulfonic Acid Polymer Electrolyte for Lithium-Oxygen Batteries," Journal of The Electrochemical Society, 2017, 164(9), A2031-A2037.

* cited by examiner

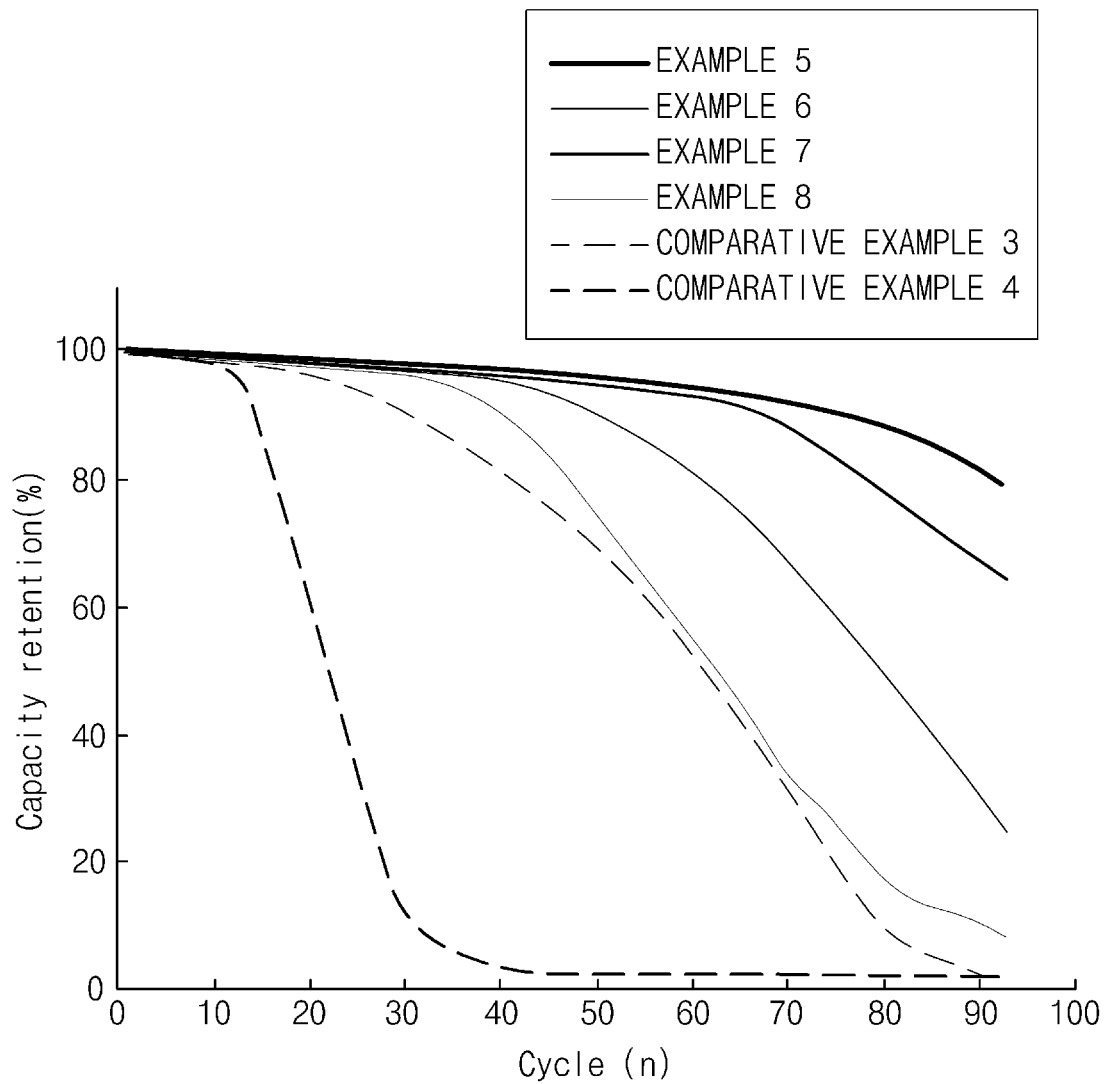

POLYMER ELECTROLYTE FOR SECONDARY BATTERY AND SECONDARY BATTERY INCLUDING THE SAME

CROSS-REFERENCES TO RELATED APPLICATIONS

This application is a U.S. national phase application, pursuant to 35 U.S.C. § 371, of PCT/KR2018/014638, filed Nov. 26, 2018, designating the United States, which claims priority to Korean Application No. 10-2017-0160818, filed Nov. 28, 2017 and Korean Application No. 10-2018-0145929, filed Nov. 23, 2018. The entire contents of the aforementioned patent applications are incorporated herein by this reference.

TECHNICAL FIELD

The present invention relates to a polymer electrolyte for a secondary battery and a secondary battery including the same.

BACKGROUND ART

There is a growing demand for high performance, high stability secondary batteries as electric, electronic, communication, and computer industries have rapidly developed. Particularly, in line with miniaturization and lightweight trends of electronic (communication) devices, thin-film and miniaturized lithium secondary batteries, as core components in this field, are required.

Lithium secondary batteries may be divided into a lithium ion battery using a liquid electrolyte and a lithium polymer battery using a polymer electrolyte depending on the electrolyte used.

With respect to the lithium ion battery, it may have high capacity, but, since the liquid electrolyte containing an electrolyte salt is used, there may be a risk of leakage and explosion and battery design may be complicated to prepare for the risk.

With respect to the lithium polymer battery, since a solid polymer electrolyte or a gel polymer electrolyte containing an electrolyte solution is used as an electrolyte, stability may be improved. Also, since the lithium polymer battery has flexibility, it may be developed in various forms, for example, in the form of small or thin-film batteries.

However, since the solid polymer electrolyte has significantly lower ionic conductivity than the liquid electrolyte, the solid polymer electrolyte may not be suitable for commercialization.

For example, with respect to polyethylene oxide which has been widely used as the polymer electrolyte, it has an excellent ability to dissociate an ion conductive metal salt despite the fact that it is in a solid state. That is, since cations of the alkali metal salt are stabilized while the cations are coordinated with oxygen atoms present in the polyethylene oxide to form a complex, the cations may be present in a stable ionic state without a solvent. However, since the polyethylene oxide has a semi-crystalline structure at room temperature and interferes with the movement of the metal salt in which a crystal structure is dissociated, it is disadvantageous in that it has a low ionic conductivity value of about $1.0 \times 10^{-8}$ S/cm at room temperature. Thus, it may not be suitable for commercialization.

Therefore, research has recently been conducted to develop a hybrid gel polymer electrolyte in which lithium ion conductivity is improved while maintaining mechanical strength by introducing a method of adding several to nearly ten times as much as the amount of a liquid electrolyte solution to a solid polymer electrolyte.

PRIOR ART DOCUMENT

U.S. Patent publication No. 2006-0177732

DISCLOSURE OF THE INVENTION

Technical Problem

An aspect of the present invention provides a polymer electrolyte for a secondary battery having improved mechanical strength and ionic conductivity.

Another aspect of the present invention provides a lithium secondary battery in which output characteristics and oxidation stability as well as capacity retention are improved by including the polymer electrolyte for a secondary battery of the present invention.

Technical Solution

According to an aspect of the present invention, there is provided a polymer electrolyte for a secondary battery which includes a polymer containing a repeating unit represented by Formula 1:

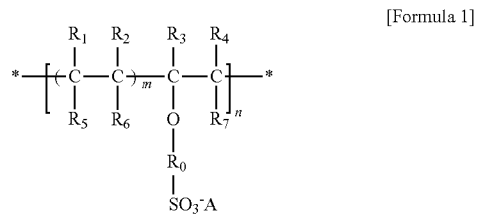

[Formula 1]

wherein, in Formula 1, $R_0$ is an alkylene group having 1 to 5 carbon atoms which is substituted with at least one halogen atom, $R_1$, $R_2$, $R_3$, $R_4$, $R_5$, $R_6$, and $R_7$ are each independently hydrogen, a halogen atom, or an alkyl group having 1 to 5 carbon atoms which is unsubstituted or substituted with at least one halogen atom, A is at least one cation selected from the group consisting of $Li^+$, $H^+$, $Na^+$, and $K^+$, and each of n and m is the number of repeating units, wherein n is an integer of 1 to 100, and m is an integer of 1 to 100.

Specifically, in Formula 1, $R_1$, $R_2$, $R_3$, $R_4$, $R_5$, $R_6$, and $R_7$ may each independently be hydrogen, a halogen atom, or an alkyl group having 1 to 3 carbon atoms, and A may be $Li^+$. Specifically, the halogen atom may be a fluorine atom.

Specifically, the repeating unit represented by Formula 1 may include at least one selected from the group consisting of repeating units represented by the following Formulae 1a to 1d.

[Formula 1a]

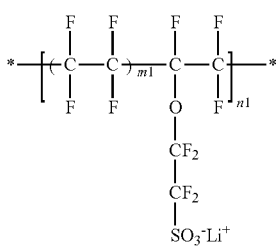

In Formula 1a,
n1 and m1 are the numbers of repeating units,
wherein n1 is an integer of 1 to 100, and
m1 is an integer of 1 to 100.

[Formula 1b]

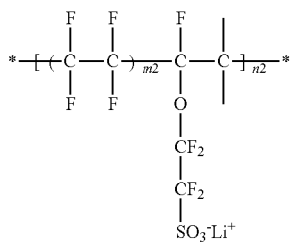

In Formula 1b,
n2 and m2 are the numbers of repeating units,
wherein n2 is an integer of 1 to 100, and
m2 is an integer of 1 to 100.

[Formula 1c]

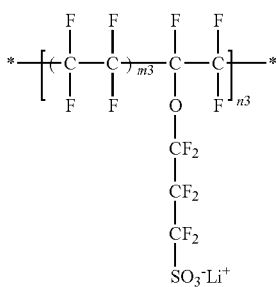

In Formula 1c,
n3 is an integer of 1 to 100, and
m3 is an integer of 1 to 100.

[Formula 1d]

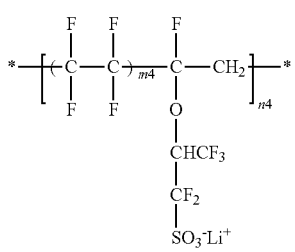

In Formula 1d,
n4 is an integer of 1 to 100, and
m4 is an integer of 1 to 100.

The polymer electrolyte for a secondary battery may be a free-standing solid polymer electrolyte or a gel polymer electrolyte.

Also, the polymer electrolyte for a secondary battery may be a gel polymer electrolyte further including a non-aqueous electrolyte solution which includes an electrolyte and a fluorinated organic solvent.

The fluorinated organic solvent included in the non-aqueous electrolyte solution may include at least one selected from the group consisting of fluoroethylene carbonate (FEC), difluoroethylene carbonate (DFEC), fluorodimethyl carbonate (F-DMC), fluoroethyl methyl carbonate (FEMC), 2,2-bis(trifluoromethyl)-1,3-dioxolane (TFDOL), methyl 2,2,2-trifluoroethyl carbonate (F3-EMC), trifluoroethyl phosphite (TFEPi), trifluoroethyl phosphate (TFEPa), 1,1,2,2-tetrafluoroethyl-2,2,2-trifluoroethyl ether, monofluorobenzene (FB), difluorobenzene, trifluorobenzene, tetrafluorobenzene, pentatrifluorobenzene, hexafluorobenzene, 1,1,2,2-tetrafluoro-3-(1,1,2,2-tetrafluoroethoxy)propane, methyl difluoroacetate, ethyl difluoroacetate, and difluoroethyl acetate.

Also, the non-aqueous electrolyte solution may further include a non-fluorinated organic solvent.

The fluorinated organic solvent and the non-fluorinated organic solvent may be included in a volume ratio of 0.5:95.5 to 100:0.

Furthermore, the non-aqueous electrolyte solution may further include an ionic liquid.

The ionic liquid may include at least one selected from the group consisting of diethylmethylammonium trifluoromethanesulfonate, dimethylpropylammonium trifluoromethanesulfonate, N,N-diethyl-N-methyl-N-(2-methoxyethyl)ammonium bis(trifluoromethanesulfonyl)imide, N-methyl-N-propylpiperidinium bis(trifluoromethanesulfonyl)imide, N-butyl-N-methyl pyrrolidinium bis(trifluoromethanesulfonyl)imide, and methyl propylpiperidinium trifluoromethanesulfonylimide.

According to another aspect of the present invention, there is provided a lithium secondary battery including the polymer electrolyte for a secondary battery of the present invention.

Advantageous Effects

According to the present invention, a polymer electrolyte for a secondary battery capable of securing high ionic conductivity and mechanical strength may be prepared by using a polymer which includes at least one repeating unit containing the same cation as that of an electrolyte salt and a sulfonate group in its structure. Also, a lithium secondary battery having improved output characteristics and oxidation stability as well as excellent capacity retention may be prepared by including the polymer electrolyte for a secondary battery.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

FIG. 1 is a graph illustrating results of measurement of capacity retentions of lithium secondary batteries according to Experimental Example 4 of the present invention.

MODE FOR CARRYING OUT THE INVENTION

Hereinafter, the present invention will be described in more detail.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

Unless otherwise specified in the present invention, the expression "*" denotes the same or different atom or a portion connected between ends of a formula.

Hereinafter, a polymer electrolyte for a secondary battery and a secondary battery including the same will be described in more detail.

Polymer Electrolyte for Secondary Battery

Specifically, a polymer electrolyte for a secondary battery according to an embodiment of the present invention includes a polymer containing a repeating unit represented by Formula 1 below.

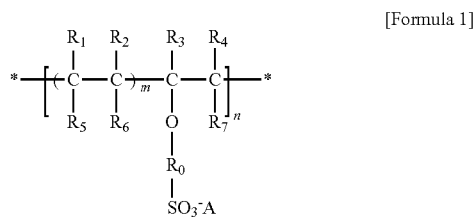

[Formula 1]

In Formula 1, $R_0$ is an alkylene group having 1 to 5 carbon atoms which is substituted with at least one halogen atom, $R_1$, $R_2$, $R_3$, $R_4$, $R_5$, $R_6$, and $R_7$ are each independently hydrogen, a halogen atom, or an alkyl group having 1 to 5 carbon atoms which is unsubstituted or substituted with at least one halogen atom, A is at least one cation selected from the group consisting of $Li^+$, $H^+$, $Na^+$, and $K^+$, and each of n and m is the number of repeating units,
wherein n is an integer of 1 to 100, and
m is an integer of 1 to 100.

Specifically, in Formula 1, $R_1$, $R_2$, $R_3$, $R_4$, $R_5$, $R_6$, and $R_7$ may each independently be hydrogen, a halogen atom, or an alkyl group having 1 to 3 carbon atoms, and A may be $Li^+$. Specifically, the halogen atom may be a fluorine atom.

In the repeating unit represented by Formula 1, the numbers of repeating units n and m may be alternatingly, graftedly, or randomly arranged while having predetermined rules between one another or having no rules.

In this case, a molar ratio of the number of repeating units n:the number of repeating units m may be in a range of 1:1 to 1:100, for example, 1:1 to 1:10.

In this case, when the molar ratio of the number of repeating units m to 1 mole of the number of repeating units n is greater than 100, since efficiency of dissociation or migration of a lithium (Li) salt may be decreased, ionic conductivity may be reduced, and, when the molar ratio of the number of repeating units m to 1 mole of the number of repeating units n is less than 1, mechanical properties may deteriorate.

The polymer containing the repeating unit represented by Formula 1 may have a weight-average molecular weight (Mw) of 5,000 g/mol to 2,000,000 g/mol, for example, 100,000 g/mol to 1,000,000 g/mol.

When the weight-average molecular weight of the polymer is within the above range, a polymer electrolyte having excellent chemical and physical stability against a liquid electrolyte solution added may be prepared.

The weight-average molecular weight (Mw) of the repeating unit represented by Formula 1 may be measured using gel permeation chromatography (GPC). For example, a sample having a predetermined concentration is prepared, and Alliance 4, a GPC measurement system, is then stabilized. When the system is stabilized, a standard sample and the sample are injected into the system to obtain a chromatogram, and a molecular weight may then be calculated using an analytical method (system: Alliance 4, Column: Ultrahydrogel linear×2, eluent: 0.1M $NaNO_3$ (pH 7.0 phosphate buffer, flow rate: 0.1 mL/min, temp: 40° C., injection: 100 μL)).

The repeating unit represented by Formula 1 may include at least one selected from the group consisting of repeating units represented by the following Formulae 1a to 1d.

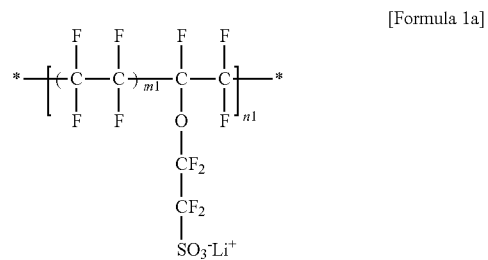

[Formula 1a]

In Formula 1a, n1 and m1 are the numbers of repeating units, wherein n1 is an integer of 1 to 100, and m1 is an integer of 1 to 100.

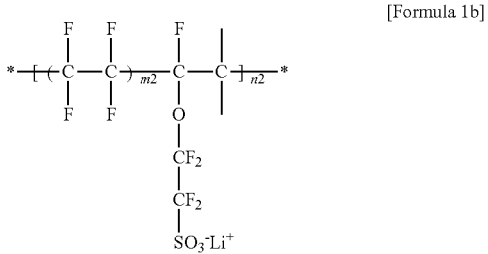

[Formula 1b]

In Formula 1b, n2 and m2 are the numbers of repeating units, wherein n2 is an integer of 1 to 100, and m2 is an integer of 1 to 100.

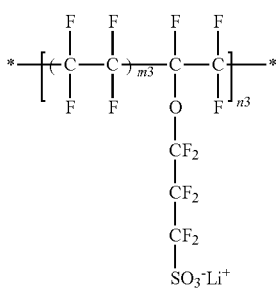

[Formula 1c]

In Formula 1c,
n3 is an integer of 1 to 100, and
m3 is an integer of 1 to 100.

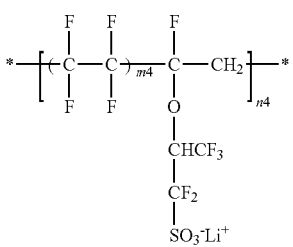

[Formula 1d]

In Formula 1d,
n4 is an integer of 1 to 100, and
m4 is an integer of 1 to 100.

(1) Solid Polymer Electrolyte

The polymer electrolyte for a secondary battery of the present invention may be a free-standing solid polymer electrolyte which includes the polymer containing the repeating unit represented by Formula 1.

When the polymer electrolyte of the present invention is the free-standing solid polymer electrolyte, since a cation source of the electrolyte salt is present in the polymer containing the repeating unit represented by Formula 1, operation of the battery in the form of an all solid-ion battery may be possible even without the use of a conventional electrolyte salt-containing liquid electrolyte.

The free-standing solid polymer electrolyte of the present invention may be formed by a conventional solution casting method known in the art.

That is, after the polymer containing at least one of the repeating units represented by Formula 1 is dissolved in an organic solvent to prepare a coating solution, the coating solution may be flow-coated (cast) on a support base material and dried to be prepared in the form of a film.

In this case, as the support base material, a glass substrate, polyethylene terephthalate (PET), Teflon, or a fluorinated ethylene propylene (FEP) film may be used, or an electrode, such as a positive electrode or a negative electrode, may be used. Furthermore, a separator may be used.

When the electrode is used as the support base material, after the polymer containing at least one of the repeating units represented by Formula 1 is dissolved in an organic solvent to prepare a coating solution, the coating solution may be coated on a surface of the electrode (negative electrode) and dried to prepare the solid polymer electrolyte.

A thickness of the solid polymer electrolyte may be appropriately controlled from a few microns (μm) to a few nanometers (nm) depending on the type of the support base material, and, specifically, the free-standing solid polymer electrolyte may have a thickness of 10 μm to 100 μm, for example, 10 μm to 50 μm.

As the organic solvent used in the coating solution for the preparation of the free-standing solid polymer electrolyte, a volatile organic solvent having a low boiling point may be used so that the organic solvent is easily removed during the drying. Typical examples of the organic solvent may be at least one selected from the group consisting of N,N'-dimethylacetamide, N-methyl-2-pyrrolidone (NMP), dimethylsulfoxide (DMSO), N,N-dimethylformamide (DMF), and acetonitrile (AN), and, specifically, N-methyl-2-pyrrolidone may be used.

An amount of the organic solvent used is not particularly limited as long as the organic solvent is used in an amount such that the polymer containing the repeating unit represented by Formula 1 is dissolved and coated to a uniform thickness, and then easily removed. Specifically, the organic solvent may be used in an amount of about 100 parts by weight to about 10,000 parts by weight, for example, 5,000 parts by weight to 10,000 parts by weight, based on 100 parts by weight of the polymer containing the repeating unit represented by Formula 1.

When the amount of the organic solvent used is greater than 10,000 parts by weight, it is not only difficult to remove the organic solvent within a short period of time, but it is also difficult to sufficiently secure effects of mechanical strength, thin-film thickness, and ionic conductivity of the polymer electrolyte due to the residual organic solvent. Also, when the amount of the organic solvent used is less than 100 parts by weight, since it is difficult to dissolve the polymer containing the repeating unit represented by Formula 1, uniformity of the film may be reduced during the molding of the polymer electrolyte.

With respect to a typical solid polymer electrolyte, it is disadvantageous in that it has low ionic conductivity because movement speed of lithium ions is low due to high resistance in the battery in comparison to a liquid electrolyte. In contrast, since the solid polymer electrolyte containing the repeating unit represented by Formula 1 of the present invention is in the form of a conjugated polymer to contain both a cation of the electrolyte salt, for example, when A is a $Li^+$ ion, a $Li^+$ ion and a sulfonate group in a polymer structure, the solid polymer electrolyte may not only suppress a side reaction of lithium ions ($Li^+$) and decomposition of the salt due to an anion stationary phase, but may also provide free lithium ions ($Li^+$), and thus, the movement effect of the lithium ions may be improved.

With respect to the solid polymer electrolyte of the present invention, excellent mechanical properties as well as high ionic conductivity may be secured. Furthermore, with respect to a lithium secondary battery including the solid polymer electrolyte, excellent cycle life characteristics, output characteristics, and thermal or chemical stability as well as excellent capacity retention may be achieved.

(2) Gel Polymer Electrolyte

With respect to the solid gel polymer electrolyte of the present invention, since the cation source is present in the polymer containing the repeating unit represented by Formula 1, it has ion transfer characteristics even if a conventional electrolyte salt-containing liquid electrolyte is not used, but the ion transfer characteristics may be less than those of the liquid electrolyte solution due to strong attraction of a solid phase.

Thus, in the present invention, a gel polymer electrolyte (e.g., solid-liquid hybrid electrolyte), which is formed by further injecting a non-aqueous electrolyte solution including an electrolyte salt and an organic solvent into the solid polymer electrolyte, may be provided in order to provide an ion transfer effect.

That is, as the solid polymer electrolyte and the electrolyte salt-containing non-aqueous electrolyte solution are used together in the gel polymer electrolyte of the present invention, the ion transfer characteristics may be improved and an electrolyte system that is more stable than the liquid electrolyte may be achieved at the same time.

Particularly, when A in the compound represented by Formula 1 is a $Li^+$ ion, since the flux of Li is made uniform, occurrence of dendrites may be reduced even when used in a lithium metal ion battery, and thus, an effect of improving lifetime may be obtained. Also, since a sulfonate group ($SO^{3-}$) is introduced into the repeating unit structure, thermal instability, such as an exothermic reaction, is reduced due to an anion repulsion effect caused by a $Li^+$ salt, and thus, thermal stability may be secured.

After the solid polymer electrolyte, which includes the polymer containing the repeating unit represented by Formula 1 of the present invention, is disposed in an electrode assembly, the electrode assembly is accommodated in a battery case, and the gel polymer electrolyte of the present invention may be prepared by a method of swelling the solid polymer electrolyte by injecting a non-aqueous electrolyte solution in which swelling is possible without dissolving the solid polymer electrolyte film.

Meanwhile, the non-aqueous electrolyte solution in which an electrolyte salt is dissolved in a fluorinated organic solvent may be used \to be injected for the preparation of the gel polymer electrolyte.

(2-1) Electrolyte Salt

In this case, any electrolyte salt typically used in an electrolyte solution for a lithium secondary battery may be used as the electrolyte salt without limitation, and, for example, the electrolyte salt may include the same cation as that included in the polymer containing the repeating unit represented by Formula 1, specifically, at least one selected from the group consisting of $Li^+$, $H^+$, $Na^+$, and $K^+$ as a cation, and may include at least one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ as an anion.

Specifically, the electrolyte salt may include the same cation as A in the compound represented by Formula 1, and may specifically include a single material selected from the group consisting of LiCl, LiBr, LiI, $LiClO_4$, $LiBF_4$, $LiB_{10}Cl_{10}$, $LiPF_6$, $LiCF_3SO_3$, $LiCH_3CO_2$, $LiCF_3CO_2$, $LiAsF_6$, $LiSbF_6$, $LiAlCl_4$, $LiAlO_4$, and $LiCH_3SO_3$, which include $Li^+$ as a cation, or a mixture of two or more thereof.

At least one electrolyte salt may be included in a normally usable range, and the electrolyte salt may be included in a concentration of 0.5 M to 4 M in the electrolyte solution in order to obtain an optimum corrosion protection film formation effect on the surface of the electrode. When the concentration of the electrolyte salt is greater than 4 M, since viscosity is high, the ion transfer characteristics may be significantly reduced.

(2-2) Fluorinated Organic Solvent

The fluorinated organic solvent is not particularly limited as long as it may minimize decomposition due to an oxidation reaction during charge and discharge of the secondary battery and may exhibit desired characteristics with an additive, and may specifically include at least one selected from the group consisting of fluoroethylene carbonate (FEC), difluoroethylene carbonate (DFEC), fluorodimethyl carbonate (F-DMC), fluoroethyl methyl carbonate (FEMC), 2,2-bis(trifluoromethyl)-1,3-dioxolane (TFDOL), methyl 2,2,2-trifluoroethyl carbonate (F3-EMC), trifluoroethyl phosphite (TFEPi), trifluoroethyl phosphate (TFEPa), 1,1,2,2-tetrafluoroethyl-2,2,2-trifluoroethyl ether, monofluorobenzene (FB), difluorobenzene, trifluorobenzene, tetrafluorobenzene, pentatrifluorobenzene, hexafluorobenzene, 1,1,2,2-tetrafluoro-3-(1,1,2,2-tetrafluoroethoxy)propane, methyl difluoroacetate, ethyl difluoroacetate, and difluoroethyl acetate.

Specifically, the fluorinated organic solvent may include at least one selected from the group consisting of fluoroethylene carbonate, difluoroethylene carbonate (DFEC), fluorodimethyl carbonate, fluoroethyl methyl carbonate (FEMC), and 2,2-bis(trifluoromethyl)-1,3-dioxolane (TFDOL).

The gel polymer electrolyte of the present invention may more improve impregnability with respect to the solid polymer electrolyte of the present invention than a non-aqueous electrolyte solution using a non-fluorinated organic solvent by using the fluorinated organic solvent as the non-aqueous electrolyte solution organic solvent.

That is, with respect to the fluorinated organic solvent, since electrons may be uniformly distributed in the non-aqueous electrolyte solution by the fluorine atom present in the structure, the fluorinated organic solvent may reduce total polarity of the non-aqueous electrolyte solution. Accordingly, when the fluorinated organic solvent is injected into the solid polymer electrolyte which includes the polymer containing the repeating unit represented by Formula 1, since the impregnability of the non-aqueous electrolyte solution including the fluorinated organic solvent is improved to a relatively non-polar part in the solid polymer electrolyte, a gel polymer electrolyte may be formed in which an entire surface of the polymer electrolyte is uniformly impregnated with the non-aqueous electrolyte solution. Thus, since flux uniformity of lithium ions ($Li^+$) in the gel polymer electrolyte is improved, a safety improvement effect as well as improvements in cycle life characteristics and output characteristics of the secondary battery may be obtained.

The organic solvent included in the non-aqueous electrolyte solution may further include at least one non-fluorinated organic solvent selected from the group consisting of a carbonate-based organic solvent, an ester-based organic solvent, an ether-based organic solvent, and an amide-based organic solvent, in addition to the fluorinated organic solvent.

Specifically, the carbonate-based organic solvent may include a cyclic carbonate-based organic solvent or a linear carbonate-based organic solvent.

The cyclic carbonate-based organic solvent is a highly viscous organic solvent which well dissociates the electrolyte salt in the electrolyte due to high permittivity, wherein typical examples of the cyclic carbonate-based organic solvent may be at least one selected from the group consisting of ethylene carbonate (EC), propylene carbonate (PC), 1,2-butylene carbonate, 2,3-butylene carbonate, 1,2-pentyl ene carbonate, 2,3-pentylene carbonate, and vinyl ene carbonate.

The linear carbonate-based organic solvent is an organic solvent having low viscosity and low permittivity, wherein typical examples of the linear carbonate-based organic solvent may be at least one selected from the group consisting of dimethyl carbonate (DMC), diethyl carbonate (DEC), dipropyl carbonate, ethylmethyl carbonate (EMC), methylpropyl carbonate, and ethylpropyl carbonate.

Also, the ester-based organic solvent may include a linear ester-based organic solvent or a cyclic ester-based organic solvent.

Specific examples of the linear ester-based organic solvent may be at least one selected from the group consisting of methyl acetate, ethyl acetate, propyl acetate, methyl propionate, ethyl propionate, propyl propionate, and butyl propionate.

Specific examples of the cyclic ester-based organic solvent may be any one selected from the group consisting of γ-butyrolactone, γ-valerolactone, γ-caprolactone, σ-valerolactone, and ε-caprolactone, or a mixture of two or more thereof.

Furthermore, typical examples of the ether-based organic solvent may include at least one selected from the group consisting of dimethyl ether, diethyl ether, dipropyl ether, methylethyl ether, methylpropyl ether, ethylpropyl ether, and 1,3-dioxolane (DOL).

Specifically, a non-aqueous electrolyte solution having high electrical conductivity may be prepared by mixing the cyclic carbonate-based organic solvent, the linear carbonate-based organic solvent, and the linear ester-based organic solvent as well as the fluorinated organic solvent, such as fluoromethyl methyl carbonate (FMMC) or fluoroethyl methyl carbonate (FEMC), in an appropriate ratio.

In this case, the fluorinated organic solvent and the non-fluorinated organic solvent may be included in a volume ratio of 0.5:95.5 to 100:0, particularly 10:90 to 70:30, and more particularly 30:70 to 60:40 in the gel polymer electrolyte of the present invention.

When the volume ratio of the fluorinated organic solvent is less than 0.5, since it is difficult to uniformly impregnate the entire surface of the solid polymer electrolyte, which includes the polymer containing the repeating unit represented by Formula 1, with the non-aqueous electrolyte solution, an effect of improving the cycle life characteristics and output characteristics of the secondary battery may be insignificant.

Specifically, the organic solvent constituting the non-aqueous electrolyte solution may be used by mixing fluoroethylene carbonate (FEC), as the fluorinated organic solvent, and ethylmethyl carbonate, as the liner carbonate-based organic solvent, in a volume ratio of 3:7, mixing fluoroethyl methyl carbonate (FEMC), ethylene carbonate (EC), and ethylmethyl carbonate (EMC) in a volume ratio of 3:3:4, mixing fluoroethylene carbonate (FEC), ethylene carbonate (EC), and ethylmethyl carbonate (EMC) in a volume ratio of 0.5:2.5:7, or mixing FEC, F3-EMC, and 1,1,2,2-tetrafluoroethyl-2,2,2-trifluoroethyl ether in a volume ratio of 2:6:2.

Also, a non-volatile organic solvent having a high boiling point, such as tetraglyme, may be further used in the non-aqueous electrolyte solution so that the organic solvent is not easily evaporated and well swells the polymer electrolyte to be able to maintain a form of the gel polymer electrolyte.

An amount of the non-aqueous electrolyte solution injected is not particularly limited, but the non-aqueous electrolyte solution may be used within a range in which the non-aqueous electrolyte solution may sufficiently wet the electrode assembly according to a conventional method, the uniformity of the film may be secured during the molding of the gel polymer electrolyte, and the effects of mechanical strength, thin-film thickness, and ionic conductivity may be sufficiently secured at the same time.

The gel polymer electrolyte may further include an ionic liquid, if necessary. The ionic liquid may be used by being further injected, after the injection of the electrolyte salt-containing non-aqueous electrolyte solution.

Since the ionic liquid, as a component having high ionic conductivity, may improve the movement of lithium ions ($Li^+$ flux) in the polymer electrolyte by being impregnated alone or being impregnated with the electrolyte solution in the polymer electrolyte, the ionic liquid may allow a phenomenon, in which $Li^+$ ions are plated or stripped on the surface of the negative electrode, to be uniform, and thus, the ionic liquid may suppress the formation of lithium dendrites and may provide stability when used in the battery due to its flame retardant properties.

As a typical example, the ionic liquid may include at least one selected from the group consisting of diethylmethylammonium trifluoromethanesulfonate, dimethylpropylammonium trifluoromethanesulfonate, N,N-diethyl-N-methyl-N-(2-methoxyethyl)ammonium bis(trifluoromethanesulfonyl)imide, N-methyl-N-propylpiperidinium bis(trifluoromethanesulfonyl)imide, N-butyl-N-methyl pyrrolidinium bis(trifluoromethanesulfonyl)imide, and methyl propylpiperidinium trifluoromethanesulfonylimide.

The ionic liquid may be included in an amount of 50 parts by weight or less, particularly 0.1 part by weight to 50 parts by weight, and more particularly 1 part by weight to 30 parts by weight based on 100 parts by weight of the non-aqueous electrolyte solution injected.

When the amount of the ionic liquid is greater than 50 parts by weight based on a total weight of the non-aqueous electrolyte solution, since the movement of the lithium ions may be difficult due to high viscosity, a uniform lithium ion movement effect may not be provided, and thus, lithium dendrites may be formed on the surface of the lithium negative electrode.

Lithium Secondary Battery

Next, a lithium secondary battery including the polymer electrolyte according to the present invention will be described.

Specifically, in the present invention, provided is a lithium secondary battery including a positive electrode, a negative electrode, and a polymer electrolyte formed on at least one surface of the positive electrode and the negative electrode, wherein the polymer electrolyte includes the polymer electrolyte of the present invention.

In this case, the polymer electrolyte may include a free-standing solid polymer electrolyte or gel polymer electrolyte.

Any positive electrode, negative electrode, and separator, which are prepared by a conventional method and used during the preparation of a lithium secondary battery, may be used as the positive electrode, negative electrode, and separator which constitute the lithium secondary battery of the present invention.

First, the positive electrode may be prepared by forming a positive electrode material mixture layer on a positive electrode collector.

The positive electrode material mixture layer may be prepared by coating the positive electrode collector with a positive electrode slurry including a positive electrode active material, a binder, a conductive agent, and a solvent, and then drying and rolling the coated positive electrode collector.

The positive electrode collector is not particularly limited so long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

The positive electrode active material is a compound capable of reversibly intercalating and deintercalating lithium, wherein the positive electrode active material may specifically include a lithium composite metal oxide including lithium and at least one metal such as cobalt, manganese, nickel, or aluminum. Specifically, the lithium composite metal oxide may include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y}Mn_YO_2$ (where $0<Y<1$), $LiMn_{2-Z}Ni_ZO_4$ (where $0<Z<2$), etc.), lithium-nickel-cobalt-based oxide (e.g., $LiNi_{1-Y1}Co_{Y1}O_2$ (where $0<Y1<1$), lithium-manganese-cobalt-based oxide (e.g., $LiCo_{1-Y2}Mn_{Y2}O_2$ (where $0<Y2<1$), $LiMn_{2-Z1}Co_{Z1}O_4$ (where $0<Z1<2$), etc.), lithium-nickel-manganese-cobalt-based oxide (e.g., $Li(Ni_pCo_qMn_{r1})O_2$ (where $0<p<1$, $0<q<1$, $0<r1<1$, and $p+q+r1=1$) or $Li(Ni_{p1}Co_{q1}Mn_{r2})O_4$ (where $0<p1<2$, $0<q1<2$, $0<r2<2$, $p1+q1+r2=2$), etc.), or lithium-nickel-cobalt-transition metal (M) oxide (e.g., $Li(Ni_{p2}Co_{q2}Mn_{r3}M_{s2})O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein $0<p2<1$, $0<q2<1$, $0<r3<1$, $0<s2<1$, and $p2+q2+r3+s2=1$), etc.), and any one thereof or a compound of two or more thereof may be included.

Among these materials, in terms of the improvement of capacity characteristics and stability of the battery, the lithium composite metal oxide may include $LiCoO_2$, $LiMnO_2$, $LiNiO_2$, lithium nickel manganese cobalt oxide (e.g., $Li(Ni_{1/3}Mn_{1/3}Co_{1/3})O_2$, $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, or $Li(Ni_{0.8}Mn_{0.1}Co_{0.1})O_2$), or lithium nickel cobalt aluminum oxide (e.g., $LiNi_{0.8}Co_{0.15}Al_{0.05}O_2$, etc.).

The positive electrode active material may be included in an amount of 80 wt % to 99.5 wt %, for example, 85 wt % to 95 wt %, based on a total weight of solid content in the positive electrode slurry. In a case in which the amount of the positive electrode active material is 80 wt % or less, since energy density is reduced, capacity may be reduced.

The binder is a component that assists in the binding between the active material and the conductive agent and in the binding with the current collector, wherein the binder is commonly added in an amount of 1 wt % to 30 wt % based on the total weight of the solid content in the positive electrode slurry. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene terpolymer (EPDM), a sulfonated EPDM, a styrene-butadiene rubber, a fluoro rubber, various copolymers, and the like.

The conductive agent is commonly added in an amount of 1 wt % to 30 wt % based on the total weight of the solid content in the positive electrode slurry.

Any conductive agent may be used without particular limitation so long as it has conductivity without causing adverse chemical changes in the battery, and, for example, a conductive material, such as: carbon powder such as carbon black, acetylene black, Ketj en black, channel black, furnace black, lamp black, and thermal black; graphite powder such as natural graphite having a highly developed crystal structure, artificial graphite, or graphite; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The solvent may include an organic solvent, such as N-methyl-2-pyrrolidone (NMP), and may be used in an amount such that desirable viscosity is obtained when the positive electrode active material as well as selectively the binder and the conductive agent are included. For example, the solvent may be included in an amount such that a concentration of the solid content in the slurry including the positive electrode active material as well as selectively the binder and the conductive agent is in a range of 10 wt % to 60 wt %, for example, 20 wt % to 50 wt %.

Also, the negative electrode may be prepared by forming a negative electrode material mixture layer on a negative electrode collector. The negative electrode material mixture layer may be formed by coating the negative electrode collector with a negative electrode slurry including a negative electrode active material, a binder, a conductive agent, and a solvent, and then drying and rolling the coated negative electrode collector.

The negative electrode collector generally has a thickness of 3 μm to 500 The negative electrode collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have fine surface roughness to improve bonding strength with the negative electrode active material. The negative electrode collector may be used in various shapes such as a film, a sheet, a foil, a net, a porous body, a foam body, a non-woven fabric body, and the like.

Furthermore, the negative electrode active material may include at least one selected from the group consisting of lithium metal, a carbon material capable of reversibly intercalating/deintercalating lithium ions, metals or alloys of lithium and these metals, a metal composite oxide, a material which may be doped and undoped with lithium, and a transition metal oxide.

As the carbon material capable of reversibly intercalating/deintercalating lithium ions, any carbon material may be used without particular limitation so long as it is a carbon-based negative electrode active material generally used in a lithium ion secondary battery, and, as a typical example, crystalline carbon, amorphous carbon, or both thereof may be used. Examples of the crystalline carbon may be graphite such as irregular, planar, flaky, spherical, or fibrous natural graphite or artificial graphite, and examples of the amorphous carbon may be soft carbon (low-temperature sintered carbon) or hard carbon, mesophase pitch carbide, and fired cokes.

As the metals or alloys of lithium and these metals, metals selected from the group consisting of copper (Cu), nickel (Ni), sodium (Na), potassium (K), rubidium (Rb), cesium (Cs), francium (Fr), beryllium (Be), magnesium (Mg), calcium (Ca), strontium (Sr), silicon (Si), antimony (Sb), lead (Pb), indium (In), zinc (Zn), barium (Ba), radium (Ra), germanium (Ge), aluminum (Al), and tin (Sn) or alloys of lithium and these metals may be used.

One selected from the group consisting of PbO, PbO$_2$, Pb$_2$O$_3$, Pb$_3$O$_4$, Sb$_2$O$_3$, Sb$_2$O$_4$, Sb$_2$O$_5$, GeO, GeO$_2$, Bi$_2$O$_3$, Bi$_2$O$_4$, Bi$_2$O$_5$, Li$_x$Fe$_2$O$_3$ (0≤x≤1), Li$_x$WO$_2$ (0≤x≤1), and Sn$_x$Me$_{1-x}$Me'$_y$O$_z$ (Me: manganese (Mn), iron (Fe), Pb, or Ge; Me': Al, boron (B), phosphorus (P), Si, Groups I, II and III elements of the periodic table, or halogen; 0≤x≤1; 1≤y≤3; 1≤z≤8) may be used as the metal composite oxide.

The material, which may be doped and undoped with lithium, may include Si, SiO$_x$ (0<x≤2), a Si—Y alloy (where Y is an element selected from the group consisting of alkali metal, alkaline earth metal, a Group 13 element, a Group 14 element, transition metal, a rare earth element, and a combination thereof, and is not Si), Sn, SnO$_2$, and Sn—Y (where Y is an element selected from the group consisting of alkali metal, alkaline earth metal, a Group 13 element, a Group 14 element, transition metal, a rare earth element, and a combination thereof, and is not Sn), and a mixture of SiO$_2$ and at least one thereof may also be used. The element Y may be selected from the group consisting of Mg, Ca, Sr, Ba, radium (Ra), scandium (Sc), yttrium (Y), titanium (Ti), zirconium (Zr), hafnium (Hf), vanadium (V), niobium (Nb), tantalum (Ta), dubidium (Db), chromium (Cr), molybdenum (Mo), tungsten (W), seaborgium (Sg), technetium (Tc), rhenium (Re), bohrium (Bh), Fe, Pb, ruthenium (Ru), osmium (Os), hassium (Hs), rhodium (Rh), iridium (Ir), palladium (Pd), platinum (Pt), Cu, silver (Ag), gold (Au), Zn, cadmium (Cd), B, Al, gallium (Ga), Sn, indium (In), Ge, phosphorus (P), arsenic (As), Sb, bismuth (Bi), sulfur (S), selenium (Se), tellurium (Te), polonium (Po), and a combination thereof.

The transition metal oxide may include lithium-containing titanium composite oxide (LTO), vanadium oxide, and lithium vanadium oxide.

The negative electrode active material may be included in an amount of 80 wt % to 99 wt % based on a total weight of solid content in the negative electrode slurry.

The binder is a component that assists in the binding between the conductive agent, the active material, and the current collector, wherein the binder is commonly added in an amount of 1 wt % to 30 wt % based on the total weight of the solid content in the negative electrode slurry. Examples of the binder may be polyvinylidene fluoride (PVDF), polyvinyl alcohol, carboxymethylcellulose (CMC), starch, hydroxypropyl cellulose, regenerated cellulose, polyvinylpyrrolidone, tetrafluoroethylene, polyethylene, polypropylene, an ethylene-propylene-diene polymer (EPDM), a sulfonated EPDM, a styrene-butadiene rubber, a fluoro rubber, and various copolymers thereof.

The conductive agent is a component for further improving the conductivity of the negative electrode active material, wherein the conductive agent may be added in an amount of 1 wt % to 20 wt % based on the total weight of the solid content in the negative electrode slurry. Any conductive agent may be used without particular limitation so long as it has conductivity without causing adverse chemical changes in the battery, and, for example, a conductive material, such as: graphite such as natural graphite or artificial graphite; carbon black such as acetylene black, Ketjen black, channel black, furnace black, lamp black, and thermal black; conductive fibers such as carbon fibers and metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The solvent may include water or an organic solvent, such as N-methyl-2-pyrrolidone (NMP) and alcohol, and may be used in an amount such that desirable viscosity is obtained when the negative electrode active material as well as selectively the binder and the conductive agent are included. For example, the solvent may be included in an amount such that a concentration of the solid content in the slurry including the negative electrode active material as well as selectively the binder and the conductive agent is in a range of 50 wt % to 75 wt %, for example, 50 wt % to 65 wt %.

Also, the lithium secondary battery of the present invention may further include a separator, if necessary.

The separator plays a role in blocking an internal short circuit between both electrodes and impregnating the electrolyte, wherein, after mixing a polymer resin, a filler, and a solvent to prepare a separator composition, the separator composition is directly coated on the electrode and dried to form a separator film, or, after the separator composition is cast on a support and dried, the separator may be prepared by laminating a separator film peeled from the support on the electrode.

A typically used porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator. Also, a typical porous nonwoven fabric, for example, a nonwoven fabric formed of high melting point glass fibers or polyethylene terephthalate fibers may be used, but the present invention is not limited thereto.

In this case, the porous separator may generally have a pore diameter of 0.01 μm to 50 μm and a porosity of 5% to 95%. Also, the porous separator may generally have a thickness of 5 μm to 300 μm.

Next, in the secondary battery of the present invention, the polymer electrolyte of the present invention is disposed on at least one surface or both surfaces of the positive electrode and the negative electrode, or at least one surface or both surfaces of the positive electrode, the negative electrode, and the separator.

In this case, as described above, ① after the polymer containing the repeating unit represented by Formula 1 is used to prepare in the form of a film, the polymer electrolyte in the form of a film is disposed (introduced) on at least one surface or both surfaces of the prepared negative electrode, positive electrode, and separator, ② after dissolving the polymer containing the repeating unit represented by Formula 1 in an organic solvent to prepare a coating solution, the polymer electrolyte may be disposed by directly coating at least one surface or both surfaces of the prepared negative electrode, positive electrode, and separator with the coating solution and then drying the coated surface, or ③ after a solid polymer electrolyte film is formed on at least one surface or both surfaces of the negative electrode, positive electrode, and separator by the above method, a liquid electrolyte is further injected to swell the solid polymer electrolyte, and thus, the polymer electrolyte may be prepared in the form of a gel polymer electrolyte (solid-liquid mixed electrolyte).

In this case, a thickness of the polymer electrolyte in the form of a film may be as thin as possible in consideration of ionic conductivity, but the thickness may be in a range of 0.1 μm to 300 μm.

When the thickness of the electrolyte film is less than 0.1 μm, since the strength of the film is significantly reduced, it is difficult to be used as an electrolyte film. When the thickness of the electrolyte film is greater than 300 μm, since it is difficult for a proton (Li$^+$), as an ion transporter, to pass through the film and a volume for each secondary battery stack is increased, it may be difficult to prepare a secondary battery having high energy density.

Specifically, when the polymer electrolyte is a free-standing solid polymer electrolyte, the thickness of the polymer electrolyte may be in a range of 10 μm to 100 μm, for example, 10 μm to 50 μm to secure mechanical strength.

Also, when the polymer electrolyte is a gel polymer electrolyte formed by injecting a liquid electrolyte solution, the thickness of the polymer electrolyte may be 10 μm or less, for example, 5 μm in consideration of swelling.

As described above, in the present invention, since the polymer electrolyte, which includes the polymer containing the repeating unit represented by Formula 1, is introduced into components of the lithium secondary battery, mechanical strength may be secured and, simultaneously, ionic conductivity may be improved to improve effects such as capacity retention and output characteristics.

Hereinafter, the present invention will be described in more detail according to examples. However, the invention may be embodied in many different forms and should not be construed as being limited to the embodiments set forth herein. Rather, these example embodiments are provided so that this description will be thorough and complete, and will fully convey the scope of the present invention to those skilled in the art.

EXAMPLES

I. Solid Polymer Electrolyte Preparation

Example 1

(Electrode Preparation)

A positive electrode active material slurry (solid content of 60 wt %) was prepared by adding a 4.2 V-class LiCoO$_2$ compound as a positive electrode active material, carbon black as a conductive agent, and polyvinylidene fluoride (PVDF), as a binder component, in a weight ratio of 92:4:2 to N-methyl-2-pyrrolidone (NMP) as a solvent.

A surface of a 20 μm thick aluminum (Al) thin film was coated with the positive electrode active material slurry and then dried to prepare a positive electrode having a 10 thick positive electrode material mixture layer formed thereon.

Also, a copper (Cu) thin film was coated with lithium metal and then rolled to prepare a 20 μm thick negative electrode.

(Solid Polymer Electrolyte Preparation)

After 1 g of a polymer containing the repeating unit represented by Formula 1a (weight-average molecular weight (Mw) 514,000, m1=4, n1=1) was added to 99 g of NMP and stirred to prepare a mixed solution, at least one surface of the above-prepared negative electrode was coated with the mixed solution and the organic solvent (NMP) was entirely removed to prepare a solid polymer electrolyte having a thickness of 30 μm on the negative electrode.

(Secondary Battery Preparation)

An electrode assembly was prepared by sequentially stacking the above-prepared positive electrode and the negative electrode having the polymer electrolyte formed thereon, and the electrode assembly was accommodated in a pouch type battery case to prepare a 4.2 V-class lithium secondary battery (full cell).

Example 2

A solid polymer electrolyte and a lithium secondary battery including the same were prepared in the same manner as in Example 1 except that a polymer containing the repeating unit represented by Formula 1b (weight-average molecular weight (Mw) 513,700, m2=4, n2=1) was used instead of the polymer containing the repeating unit represented by Formula 1a during the preparation of the solid polymer electrolyte.

Example 3

A solid polymer electrolyte and a lithium secondary battery including the same were prepared in the same manner as in Example 1 except that a polymer containing the repeating unit represented by Formula 1c (weight-average molecular weight (Mw) 515,800, m3=4, n3=1) was used instead of the polymer containing the repeating unit represented by Formula 1a during the preparation of the solid polymer electrolyte.

Example 4

A solid polymer electrolyte and a lithium secondary battery including the same were prepared in the same manner as in Example 1 except that a polymer containing the repeating unit represented by Formula 1d (weight-average molecular weight (Mw) 513,900, m4=4, n4=1) was used instead of the polymer containing the repeating unit represented by Formula 1a during the preparation of the solid polymer electrolyte.

Comparative Example 1

A solid polymer electrolyte and a lithium secondary battery including the same were prepared in the same manner as in Example 1 except that a linear polyethylene glycol copolymer was used instead of the polymer containing the repeating unit represented by Formula 1a during the preparation of the solid polymer electrolyte.

Comparative Example 2

A solid polymer electrolyte and a lithium secondary battery including the same were prepared in the same manner as in Comparative Example 1 except that a sulfonated polyphenylene sulfide (sPPS) copolymer was used instead of the linear polyethylene glycol copolymer during the preparation of the solid polymer electrolyte.

II. Gel Polymer Electrolyte Preparation

Example 5

(Electrode Preparation)

A positive electrode active material slurry (solid content of 60 wt %) was prepared by adding a 4.2 V-class LiCoO$_2$ compound as a positive electrode active material, carbon black as a conductive agent, and PVDF, as a binder component, in a weight ratio of 92:4:2 to N-methyl-2-pyrrolidone (NMP) as a solvent.

A surface of a 20 μm thick aluminum (Al) thin film was coated with the positive electrode active material slurry and then dried to prepare a positive electrode having a 10 thick positive electrode material mixture layer formed thereon.

Also, a copper (Cu) thin film was coated with lithium metal and then rolled to prepare a 20 μm thick negative electrode.

(Solid Polymer Electrolyte Preparation)

After 1 g of a polymer containing the repeating unit represented by Formula 1a (weight-average molecular weight (Mw) 514,000, m1=4, n1=1) was added to 99 g of NMP and stirred to prepare a mixed solution, at least one surface of the negative electrode was coated with the mixed solution and the organic solvent (NMP) was entirely removed to prepare a solid polymer electrolyte having a thickness of 1.5 µm on the negative electrode.

(Secondary Battery Preparation)

An electrode assembly was prepared by sequentially stacking the above-prepared positive electrode, the negative electrode including the polymer electrolyte, and a polyolefin-based separator (thickness: 20 µm), and the electrode assembly was then accommodated in a pouch type battery case.

Subsequently, 700 µℓ of a non-aqueous electrolyte solution composed of an organic solvent (fluoroethylene carbonate (FEC):ethylmethyl carbonate (EMC)=volume ratio of 3:7), in which 1 M $LiPF_6$ was dissolved, was further injected to prepare a 4.2 V-class lithium secondary battery (full cell) including a gel polymer electrolyte.

Example 6

A secondary battery was prepared in the same manner as in Example 5 except that a polymer containing the repeating unit represented by Formula 1b (weight-average molecular weight (Mw) 513,700, m2=4, n2=1) was used instead of the polymer containing the repeating unit represented by Formula 1a during the preparation of the solid polymer electrolyte.

Example 7

A secondary battery was prepared in the same manner as in Example 5 except that a polymer containing the repeating unit represented by Formula 1c (weight-average molecular weight (Mw) 515,800, m3=4, n3=1) was used instead of the polymer containing the repeating unit represented by Formula 1a during the preparation of the solid polymer electrolyte.

Example 8

A secondary battery was prepared in the same manner as in Example 5 except that a polymer containing the repeating unit represented by Formula 1d (weight-average molecular weight (Mw) 513,900, m4=4, n4=1) was used instead of the polymer containing the repeating unit represented by Formula 1a during the preparation of the solid polymer electrolyte.

Example 9

A secondary battery was prepared in the same manner as in Example 5 except that 140 µl (20 parts by weight) of an ionic liquid (Pyr13-FSI) was further injected after the injection of the non-aqueous electrolyte solution during the preparation of the secondary battery.

Example 10

A secondary battery was prepared in the same manner as in Example 8 except that 140 µℓ (20 parts by weight) of an ionic liquid (Pyr13-FSI) was further injected after the injection of the non-aqueous electrolyte solution during the preparation of the secondary battery.

Example 11

A secondary battery was prepared in the same manner as in Example 5 except that a non-aqueous electrolyte solution composed of an organic solvent (fluoroethyl methyl carbonate (FEMC):ethylene carbonate (EC):ethylmethyl carbonate (EMC)=volume ratio of 3:3:4), in which 1 M $LiPF_6$ was dissolved, was injected during the preparation of the secondary battery.

Example 12

A secondary battery was prepared in the same manner as in Example 5 except that a non-aqueous electrolyte solution composed of an organic solvent (fluoroethylene carbonate (FEC):2,2-bis(trifluoromethyl)-1,3-dioxolane (TFDOL):ethylmethyl carbonate (EMC)=volume ratio of 3:0.5:6.5), in which 1 M $LiPF_6$ was dissolved, was injected during the preparation of the secondary battery.

Example 13

A secondary battery was prepared in the same manner as in Example 5 except that a non-aqueous electrolyte solution composed of an organic solvent (fluoroethylene carbonate (FEC):ethylenecarbonate (EC):ethylmethyl carbonate (EMC)=volume ratio of 0.5:2.5:7), in which 1 M $LiPF_6$ was dissolved, was injected during the preparation of the secondary battery.

Example 14

A secondary battery was prepared in the same manner as in Example 5 except that a non-aqueous electrolyte solution composed of an organic solvent (FEC:F3-EMC:1,1,2,2-tetrafluoroethyl-2,2,2-trifluoroethyl ether=volume ratio of 2:6:2), in which 1 M $LiPF_6$ was dissolved, was injected during the preparation of the secondary battery.

Example 15

A secondary battery was prepared in the same manner as in Example 13 except that 140 µl (20 parts by weight) of an ionic liquid (Pyr13-FSI) was further injected after the injection of the non-aqueous electrolyte solution during the preparation of the secondary battery.

Example 16

A secondary battery was prepared in the same manner as in Example 14 except that 140 µl (20 parts by weight) of an ionic liquid (Pyr13-FSI) was further injected after the injection of the non-aqueous electrolyte solution during the preparation of the secondary battery.

Comparative Example 3

A secondary battery was prepared in the same manner as in Example 5 except that, after an electrode assembly prepared by using the solid polymer electrolyte prepared in Comparative Example 1 was accommodated in a pouch type battery case, a gel polymer electrolyte was included by further injecting 700 µℓ of a non-aqueous electrolyte solution composed of an organic solvent (FEC/EMC=volume ratio of 3:7), in which 1 M $LiPF_6$ was dissolved, during the preparation of the secondary battery.

Comparative Example 4

A secondary battery was prepared in the same manner as in Example 5 except that, after an electrode assembly prepared by using the solid polymer electrolyte prepared in Comparative Example 2 was accommodated in a pouch type battery case, a gel polymer electrolyte was included by further injecting 700 µℓ of a non-aqueous electrolyte solution composed of an organic solvent (FEC/EMC=volume ratio of 3:7), in which 1 M LiPF$_6$ was dissolved, during the preparation of the secondary battery.

Comparative Example 5

A secondary battery was prepared in the same manner as in Example 5 except that a gel polymer electrolyte was included by further injecting 700 µℓ of a non-aqueous electrolyte solution composed of an organic solvent (ethylene carbonate:ethylmethyl carbonate=volume ratio of 4:6), in which 1 M LiPF$_6$ was dissolved, during the preparation of the secondary battery.

EXPERIMENTAL EXAMPLES

Experimental Example 1. Tensile Strength Evaluation of Solid Polymer Electrolyte Electrolyte specimens were prepared by using the mixed solutions for preparing a solid polymer electrolyte which were prepared in Example 1 to 4 and the mixed solutions for preparing a solid polymer electrolyte which were prepared in Comparative Examples 1 and 2, and tensile strengths of these specimens were measured.

The electrolyte specimens were collectively prepared according to ASTM standard D638 (Type V specimens), and the tensile strength was measured at a rate of 5 mm per minute at a temperature of 25° C. and a relative humidity of about 30% using Lloyd LR-10K. The results thereof are presented in Table 1 below.

TABLE 1

|  | Tensile strength (MPa) |
| --- | --- |
| Example 1 | 8.9 |
| Example 2 | 9.3 |
| Example 3 | 7.8 |
| Example 4 | 7.2 |
| Comparative Example 1 | 5.2 |
| Comparative Example 2 | 0.01 |

Referring to Table 1, tensile strengths of the solid polymer electrolytes prepared by using the mixed solutions for preparing a solid polymer electrolyte of Example 1 to 4 of the present invention were about 7.2 MPa or greater, wherein it may be understood that the tensile strengths were better than those of the solid polymer electrolytes prepared by using the mixed solutions for preparing a solid polymer electrolyte of Comparative Examples 1 and 2.

Experimental Example 2. Capacity Retention Evaluation Test of Secondary Battery Including Solid Polymer Electrolyte (1)

The lithium secondary batteries prepared in Examples 1 to 4 and the lithium secondary batteries prepared in Comparative Examples 1 and 2 were respectively charged at 0.2 C/4.25 V under a constant current/constant voltage (CC/CV) condition at a temperature of 25° C. and discharged at a constant current of 0.5 C/3.0 V. The above charging and discharging were set as one cycle, and 100 cycles of charging and discharging were performed.

In this case, capacity after each cycle from the first cycle was measured using PNE-0506 charge/discharge equipment (manufacturer: PNE SOLUTION Co., Ltd., 5 V, 6 A).

Subsequently, the number (n) of cycles when capacity retention relative to initial capacity was maintained at 80% was measured, and values thereof are presented in Table 2 below.

TABLE 2

|  | The number of cycles (n) |
| --- | --- |
| Example 1 | 45 |
| Example 2 | 40 |
| Example 3 | 41 |
| Example 4 | 38 |
| Comparative Example 1 | 8 |
| Comparative Example 2 | 2 |

As illustrated in Table 2, with respect to the lithium secondary batteries including the solid polymer electrolytes prepared in Examples 1 to 4, it may be understood that the number of cycles when capacity retention was maintained at 80% was significantly larger than those of the lithium secondary batteries including the solid polymer electrolytes prepared in Comparative Examples 1 and 2.

Experimental Example 3. Ionic Conductivity Evaluation of Gel Polymer Electrolyte After 1 g of a polymer containing the repeating unit represented by Formula 1a (weight-average molecular weight (Mw) 514,000, m1=4, n1=1) was added to 99 g of NMP and stirred to prepare a mixed solution, a surface of Teflon release paper was coated with the mixed solution and the organic solvent (NMP) was entirely removed to prepare a solid polymer electrolyte having a thickness of 20 µm.

The solid polymer electrolyte was punched in the form of a coin cell, and the solid polymer electrolyte was then stacked on a first steel use stainless (SUS) layer usable as a working electrode.

150 µl of the non-aqueous electrolyte solution (organic solvent (fluoroethylene carbonate (FEC):ethylmethyl carbonate (EMC)=volume ratio of 3:7) in which 1 M LiPF$_6$ was dissolved) used in Example 5 was further injected onto the stacked solid polymer electrolyte to prepare a gel polymer electrolyte having the same configuration as Example 5.

After the gel polymer electrolyte was covered with a second SUS layer to prepare a multilayer structure composed of first SUS layer/gel polymer electrolyte/second SUS layer, ionic conductivity was measured in a frequency range of 0.1 Hz to 100 MHz using a VMP3 measurement instrument and a precision impedance analyzer (4294A), and the results thereof are presented in Table 3 below.

Also, a multilayer structure composed of first SUS layer/gel polymer electrolyte/second SUS layer was prepared in the same manner as described above except that gel polymer electrolytes having the same configurations as the gel polymer electrolytes of Examples 6 to 16 and the gel polymer electrolytes of Comparative Examples 3 to 5, instead of the gel polymer electrolyte having the same configuration as Example 5, were respectively used during the preparation of the multilayer structure composed of the first SUS layer/gel polymer electrolyte/second SUS layer.

Subsequently, ionic conductivity of the gel polymer electrolyte in each structure was measured in a frequency range of 0.1 Hz to 100 MHz using the VMP3 measurement instrument and the precision impedance analyzer (4294A), and the results thereof are presented in Table 3 below.

TABLE 3

| | Ionic conductivity (S/cm) |
|---|---|
| Example 5 | $2.0 \times 10^{-4}$ |
| Example 6 | $1.8 \times 10^{-4}$ |
| Example 7 | $2.2 \times 10^{-4}$ |
| Example 8 | $2.4 \times 10^{-4}$ |
| Example 9 | $1.5 \times 10^{-4}$ |
| Example 10 | $1.2 \times 10^{-4}$ |
| Example 11 | $1.4 \times 10^{-4}$ |
| Example 12 | $2.2 \times 10^{-4}$ |
| Example 13 | $1.3 \times 10^{-4}$ |
| Example 14 | $2.0 \times 10^{-4}$ |
| Example 15 | $1.2 \times 10^{-4}$ |
| Example 16 | $1.6 \times 10^{-4}$ |
| Comparative Example 3 | $5.0 \times 10^{-5}$ |
| Comparative Example 4 | $2.0 \times 10^{-6}$ |
| Comparative Example 5 | $1.1 \times 10^{-4}$ |

As illustrated in Table 3, ionic conductivities of the gel polymer electrolytes prepared in Comparative Examples 3 to 5 were mostly $1.1 \times 10^{-4}$ S/cm or less, but ionic conductivities of the gel polymer electrolytes prepared in Examples 5 to 16 were mostly $1.2 \times 10^{-4}$ S/cm or greater, wherein it may be understood that the ionic conductivities were improved in comparison to those of the gel polymer electrolytes prepared in Comparative Examples 3 to 5.

Experimental Example 4. Capacity Retention Evaluation Test of Secondary Battery Including Gel Polymer Electrolyte (2)

The lithium secondary batteries prepared in Examples 5 to 16 and the lithium secondary batteries prepared in Comparative Examples 3 to 5 were respectively charged at 0.2 C/4.25 V under a constant current/constant voltage (CC/CV) condition at a temperature of 25° C. and discharged at a constant current of 0.5 C/3.0 V.

The above charging and discharging were set as one cycle, and 100 cycles of charging and discharging were performed.

In this case, capacity after each cycle from the first cycle was measured using the PNE-0506 charge/discharge equipment (manufacturer: PNE SOLUTION Co., Ltd., 5 V, 6 A).

Subsequently, the number (n) of cycles when capacity retention relative to initial capacity was maintained at 80% was measured, and values thereof are presented in Table 4 below.

In addition, the results of evaluation of cycle life characteristics of the secondary batteries prepared in Examples 5 to 8 and the secondary batteries prepared in Comparative Examples 3 and 4 are illustrated in FIG. 1.

TABLE 4

| | The number of cycles (n) |
|---|---|
| Example 5 | 93 |
| Example 6 | 60 |
| Example 7 | 78 |
| Example 8 | 47 |
| Example 9 | 88 |
| Example 10 | 75 |
| Example 11 | 95 |
| Example 12 | 102 |
| Example 13 | 95 |
| Example 14 | 99 |
| Example 15 | 86 |
| Example 16 | 93 |
| Comparative Example 3 | 16 |
| Comparative Example 4 | 4 |
| Comparative Example 5 | 45 |

As illustrated in Table 4, with respect to the lithium secondary batteries including the gel polymer electrolytes prepared in Examples 5 to 16, it may be understood that the number of cycles when capacity retention was maintained at 80% was significantly greater than those of the lithium secondary batteries including the gel polymer electrolytes prepared in Comparative Examples 3 to 5.

Particularly, referring to FIG. 1, it may be understood that capacity of the secondary battery of Comparative Example 3 was rapidly reduced after two cycles, and capacity of the secondary battery of Comparative Example 4 was reduced after 25 cycles. In contrast, in terms of the fact that capacities of the secondary batteries prepared in Examples 5 to 8 were gradually reduced after 40 cycles, it may be understood that cycle life characteristics were improved in comparison to those of the secondary batteries prepared in Comparative Examples 4 and 5.

Experimental Example 5. Electrochemical Oxidation Stability Evaluation Test of Secondary Battery Electrochemical (oxidation) stabilities of the lithium secondary batteries prepared in Examples 1 to 16 and the secondary batteries prepared in Comparative Examples 1 to 5 were measured using linear sweep voltammetry (LSV). A potentiostat (EG&G; model 270A) was used as a measuring device, and measurement temperature was 60° C. The results thereof are presented in Table 5 below.

TABLE 5

| | Oxidation stability (V) @60° C. |
|---|---|
| Example 1 | 5.3 |
| Example 2 | 5.1 |
| Example 3 | 5.5 |
| Example 4 | 4.9 |
| Example 5 | 4.9 |
| Example 6 | 4.8 |
| Example 7 | 4.7 |
| Example 8 | 4.8 |
| Example 9 | 5.2 |
| Example 11 | 4.9 |
| Example 12 | 5.0 |
| Example 13 | 4.9 |
| Example 14 | 5.5 |
| Example 15 | 5.1 |
| Example 16 | 5.6 |
| Comparative Example 1 | 3.9 |
| Comparative Example 2 | 4.2 |
| Comparative Example 3 | 3.9 |

TABLE 5-continued

| | Oxidation stability (V) @60° C. |
|---|---|
| Comparative Example 4 | 4.2 |
| Comparative Example 5 | 4.6 |

As illustrated in Table 5, with respect to the lithium secondary batteries prepared in Examples 1 to 16, since oxidation initiation voltages were in a high voltage range of about 4.7 V or more, it was confirmed that the lithium secondary batteries prepared in Examples 1 to 16 exhibited excellent electrochemical (oxidation) stabilities.

In contrast, with respect to the lithium secondary batteries prepared in Comparative Examples 1 to 5, it may be understood that oxidation initiation voltages were mostly in a range of 4.6 V or less, which was lower than those of the secondary batteries of Examples 1 to 16.

Thus, it may be understood that, in the high voltage range, the oxidation stabilities of the secondary batteries of Examples 1 to 16 were improved in comparison to those of the secondary batteries of Comparative Examples 1 to 5.

The invention claimed is:

1. A polymer electrolyte for a secondary battery, comprising a polymer containing a repeating unit represented by Formula 1:

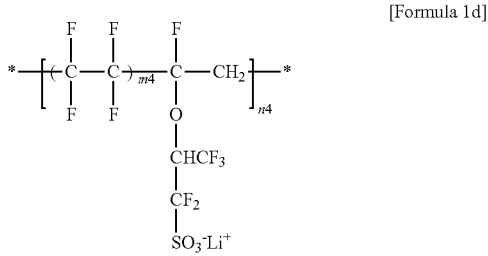

[Formula 1d]

wherein, in Formula 1d,
n4 is an integer of 1 to 100, and m4 is an integer of 1 to 100,
wherein a weight average molecular weight of the polymer containing the repeating unit represented by Formula 1d is 5,000 to 2,000,000,
wherein the polymer electrolyte is a gel polymer electrolyte further comprising a non-aqueous electrolyte solution which includes an electrolyte and a fluorinated organic solvent.

2. The polymer electrolyte of claim 1, wherein the fluorinated organic solvent comprises at least one selected from the group consisting of fluoroethylene carbonate, difluoroethylene carbonate, fluorodimethyl carbonate, fluoroethyl methyl carbonate, 2,2-bis(trifluoromethyl)-1,3-dioxolane, methyl 2,2,2-trifluoroethyl carbonate, trifluoroethyl phosphite, trifluoroethyl phosphate, 1,1,2,2-tetrafluoroethyl-2,2,2-trifluoroethyl ether, monofluorobenzene, difluorobenzene, trifluorobenzene, tetrafluorobenzene, pentatrifluorobenzene, hexafluorobenzene, 1,1,2,2-tetrafluoro-3-(1,1,2,2-tetrafluoroethoxy)propane, methyl difluoroacetate, ethyl difluoroacetate, and difluoroethyl acetate.

3. The polymer electrolyte of claim 1, wherein the non-aqueous electrolyte solution further comprises a non-fluorinated organic solvent.

4. The polymer electrolyte of claim 3, wherein the fluorinated organic solvent and the non-fluorinated organic solvent are included in a volume ratio of 0.5:95.5 to 100:0.

5. The polymer electrolyte of claim 1, wherein the non-aqueous electrolyte solution further comprises an ionic liquid.

6. The polymer electrolyte of claim 5, wherein the ionic liquid comprises at least one selected from the group consisting of diethylmethylammonium trifluoromethanesulfonate, dimethylpropylammonium trifluoromethanesulfonate, N,N-diethyl-N-methyl-N-(2-methoxyethyl) ammonium bis(trifluoromethanesulfonyl)imide, N-methyl-N-propylpiperidinium bis(trifluoromethanesulfonyl)imide, N-butyl-N-methyl pyrrolidinium bis(trifluoromethanesulfonyl)imide, and methyl propylpiperidinium trifluoromethanesulfonylimide.

7. The polymer electrolyte of claim 1, wherein the weight average molecular weight of the polymer containing the repeating unit represented by Formula 1 is 100,000 to 1,000,000.

8. The polymer electrolyte of claim 1, wherein a molar ratio of the number of repeating units n4 to the number of repeating units m4 is in a range of 1:1 to 1:100.

9. The polymer electrolyte of claim 1, wherein a molar ratio of the number of repeating units n4 to the number of repeating units m4 is in a range of 1:1 to 1:10.

10. A lithium secondary battery comprising the polymer electrolyte of claim 1.

* * * * *